(12) United States Patent
Suzuki et al.

(10) Patent No.: US 6,335,305 B1
(45) Date of Patent: Jan. 1, 2002

(54) CATALYST FOR PURIFYING EXHAUST GAS

(75) Inventors: Tadashi Suzuki; Akira Morikawa; Hideo Sobukawa, all of Aichi (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 09/547,347

(22) Filed: Apr. 11, 2000

Related U.S. Application Data

(63) Continuation-in-part of application No. 09/477,624, filed on Jan. 4, 2000.

(30) Foreign Application Priority Data

Jan. 18, 1999 (JP) ................................. 11-9826
Jan. 18, 2000 (JP) ............................ 12-008589

(51) Int. Cl.$^7$ ..................... B01J 23/00; B01J 23/40; B01J 23/58; B01J 23/56; B01J 23/44
(52) U.S. Cl. ................ 502/325; 502/327; 502/328; 502/330; 502/332; 502/333; 502/334; 502/339
(58) Field of Search ............... 502/325, 326, 502/327, 328, 329, 330, 331, 332, 333, 334, 335, 336, 337, 338, 339, 355, 439, 303, 304, 237, 263; 423/213.5

(56) References Cited

U.S. PATENT DOCUMENTS

| | | | | |
|---|---|---|---|---|
| 4,537,873 A | * | 8/1985 | Kato et al. | 502/242 |
| 4,585,752 A | * | 4/1986 | Ernest | 502/314 |
| 4,906,176 A | * | 3/1990 | Yamashita et al. | 431/7 |
| 5,075,276 A | * | 12/1991 | Ozawa et al. | 502/304 |
| 5,179,059 A | * | 1/1993 | Domesle et al. | 502/303 |
| 5,260,249 A | * | 11/1993 | Shiraishi et al. | 502/304 |
| 5,607,892 A | * | 3/1997 | Chopin et al. | 502/304 |
| 5,693,299 A | | 12/1997 | Chopin et al. | |
| 5,712,218 A | | 1/1998 | Chopin et al. | |
| 6,022,825 A | * | 2/2000 | Andersen et al. | 502/303 |
| 6,103,660 A | * | 8/2000 | Yperen et al. | 502/327 |
| 6,150,288 A | * | 11/2000 | Suzuki et al. | 501/105 |
| 6,150,299 A | * | 11/2000 | Umemoto et al. | 502/304 |
| 6,180,075 B1 | * | 1/2001 | Lindner et al. | 423/213.2 |

FOREIGN PATENT DOCUMENTS

| | | |
|---|---|---|
| EP | 0 428 752 B1 * | 5/1991 |
| EP | 0 507 590 A1 * | 10/1992 |
| EP | 0 684 072 | 11/1995 |
| EP | 0 834 348 | 4/1998 |
| FR | 2 736 343 | 1/1997 |
| JP | 3-131343 | 6/1991 |

* cited by examiner

*Primary Examiner*—Stuart L. Hendrickson
*Assistant Examiner*—Cam N. Nguyen
(74) *Attorney, Agent, or Firm*—Oblon, Spivak, McClelland, Maier & Neustadt, P.C.

(57) ABSTRACT

A catalyst for purifying an exhaust gas includes a support and a noble metal loaded on the support. The support includes a mixture containing a porous oxide and a composite oxide. The composite oxide is expressed by the following formula:

$$(Al_2O_3)_a(CeO_2)_b(ZrO_2)_{1-b}$$

in which the values "a" and "b" are molar ratios and the value "a" falls in a range of from 0.4 to 2.5 and the value "b" falls in a range of from 0.2 to 0.7. The support includes a particle having a particle diameter of 5 $\mu$m or more in an amount of 30% by volume or more. With the thus arranged support, even when the catalyst is subjected to such a severe durability test that it is heated at 1,000° C. for 10 to 20 hours, it exhibits a high purifying activity, and its coating layer is inhibited from cracking or coming off.

23 Claims, 2 Drawing Sheets

CATALYST FOR PURIFYING EXHAUST GAS

This is a continuation-in-part of application (preliminary) Ser. No. 09/477,624, filed Jan. 4, 2000.

BACKGROUND OF THE INVENTION

1. Field of the Invention

The present invention relates to a catalyst for purifying an exhaust gas which is used in exhaust systems of automobiles. More particularly, it relates to an improvement on heat resistance of an exhaust-gas-purifying catalyst which includes a ceria-zirconia composite oxide.

2. Description of the Related Art

As an exhaust-gas-purifying catalyst which is used in exhaust systems of automobiles, a 3-way catalyst is used widely which purifies HC, CO and $NO_x$ simultaneously. This 3-way catalyst is arranged so that a porous oxide, such as alumina ($Al_2O_3$) and silica ($SiO_2$), makes a support and a noble metal, such as platinum (Pt) and rhodium (Rh), is loaded on the support. The HC and CO adsorbed on the catalyst is purified by oxidizing, and the $NO_x$ is purified by reducing.

This 3-way catalyst is designed so that it exhibits the highest conversions when it contacts with an exhaust gas whose air-fuel ratio of the air-fuel mixture is an ideal air-fuel ratio, i.e., a stoichiometric atmosphere. However, depending on the driving conditions of automobiles, the actual air-fuel ratio fluctuates on a rich side or a lean side about the stoichiometric atmosphere. Accordingly, the exhaust-gas atmosphere fluctuates as well. Consequently, high purifying performance cannot necessarily be secured by the 3-way catalyst of the aforementioned arrangement alone.

Hence, a 3-way catalyst has been known in which ceria ($CeO_2$) is included in the support. Since the ceria has an oxygen storage-and-release ability, oxygen is stored in the ceria in oxygen rich atmospheres, and is released in oxygen lean atmospheres. Therefore, the fluctuation of the exhaust-gas atmospheres can be relieved by including the ceria, and the purifying performance is upgraded. Further, it is preferable to include a ceria-zirconia composite oxide, in which ceria is composited with zirconia ($ZrO_2$) in a support. By compositing with the zirconia, the thermal stability of the ceria is enhanced remarkably.

For example, Japanese Unexamined Patent Publication (KOKAI) No. 10-182,155 discloses an exhaust-gas-purifying catalyst in which a noble metal is loaded on a composite oxide which includes at least two members selected from the group consisting of cerium, zirconium and aluminum.

By the way, the recent increment of high-speed driving, etc., resulted in considerably high temperatures of exhaust gases of automobiles. Accordingly, it is necessary to carry out the durability test on exhaust-gas-purifying catalysts under severer conditions.

In the aforementioned conventional exhaust-gas-purifying catalyst, no problem arises when the catalyst is subjected to a durability test in which it is heated at 1,000° C. for a few hours, for instance. However, when it is subjected to a severe durability in which it is heated at 1,000° C. for 20 hours, the following have been found out. Namely, depending on the composition of the support, the phase separation occurs in the solid solution of ceria and zirconia.

Further, general exhaust-gas-purifying catalysts employ a honeycomb-shaped substrate, which is formed of cordierite or a metallic foil and exhibits good heat resistance, and are used by forming a coating layer, which is formed on the substrate and includes a loaded particle loaded with a noble metal. However, when a catalyst, which is provided with a conventional coating layer including a composite oxide support disclosed in Japanese Unexamined Patent Publication No. 10-182,155, is subjected to a severe durability test, the following have been found out. Namely, there arises a drawback in that the coating layer is cracked by the thermal contraction of the support, or in that the coating layer comes off.

It is therefore an object of the present invention to further improve the heat resistance of an exhaust-gas-purifying catalyst, in which a noble metal is loaded on a support including a ceria-zirconia solid solution, to make the catalyst exhibit high purifying activity even after a severe durability test, and to inhibit its coating layer from cracking and coming off.

SUMMARY OF THE INVENTION

In a first aspect of the present invention, a catalyst for purifying an exhaust gas comprises:

a support including a mixture containing a porous oxide and a composite oxide; and a noble metal loaded on the support, the composite oxide expressed by a general formula (1);

$$(Al_2O_3)_a(CeO_2)_b(ZrO_2)_{1-b} \tag{1}$$

in which the values "a" and "b" are molar ratios falling in the range of $0.4 \leq \text{"a"} \leq 2.5$, and $0.2 \leq \text{"b"} \leq 0.7$, respectively; and the support including a particle having a particle diameter of 5 μm or more in an amount of 30% by volume or more.

In a second aspect of the present invention, a catalyst for purifying an exhaust gas comprises:

a support including a mixture containing a porous oxide and a composite oxide; and a noble metal loaded on the support;

the composite oxide expressed by a general formula (2);

$$(Al_2O_3)_a(CeO_2)_b(ZrO_2)_{1-b}(Y_2O_3)_c \tag{2}$$

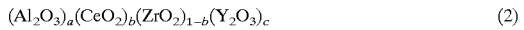

in which "a", "b", and "c" are molar ratios falling in the range of $0.4 \leq \text{"a"} \leq 2.5$, $0.2 \leq \text{"b"} \leq 0.7$, and $0.01 \leq \text{"c"} \leq 0.2$, respectively; and the support including a particle having a particle diameter of 5 μm or more in an amount of 30% by volume or more.

In a third aspect of the present invention, a catalyst for purifying an exhaust gas comprises:

a support including a mixture containing a porous oxide and a composite oxide; and a noble metal loaded on the support;

the composite oxide expressed by a general formula (3);

$$(Al_2O_3)_a(CeO_2)_b(ZrO_2)_{1-b}(La_2O_3)_d \tag{3}$$

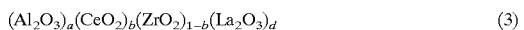

in which "a", "b", and "d" are molar ratios falling in the range of $0.4 \leq \text{"a"} \leq 2.5$, $0.2 \leq \text{"b"} \leq 0.7$, and $0.005 \leq \text{"d"} \leq 0.1$, respectively; and the support including a particle having a particle diameter of 5 μm or more in an amount of 30% by volume or more.

In a fourth aspect of the present invention, a catalyst for purifying an exhaust gas comprises:
   a support including a mixture containing a porous oxide and a composite oxide; and
   a noble metal loaded on the support;
      the composite oxide expressed by a general formula (4);

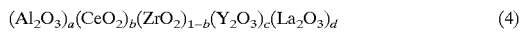

$$(Al_2O_3)_a(CeO_2)_b(ZrO_2)_{1-b}(Y_2O_3)_c(La_2O_3)_d \quad (4)$$

in which the values "a", "b", "c" and "d" are molar ratios falling in the range of $0.4 \leq \text{"a"} \leq 2.5$, $0.2 \leq \text{"b"} \leq 0.7$, $0.01 \leq \text{"c"} \leq 0.2$, and $0.005 \leq \text{"d"} \leq 0.1$, respectively; and
   the support including a particle having a particle diameter of 5 μm or more in an amount of 30% by volume or more.

In a fifth aspect of the present invention, the $CeO_2$ and the $ZrO_2$ contained in the composite oxide, form a solid solution; and a solubility of the $ZrO_2$ is 50% or more in the composite oxide.

In a sixth aspect of the present invention, a mean crystal diameter of the ceria-zirconia solid solution, contained in the composite oxide, is 10 nm or less by an X-ray diffraction measurement after heating the support at 1,000° C. for 5 hours or more.

In a seventh aspect of the present invention, a weight ratio of the porous oxide and the composite oxide in the support satisfies the condition $0.30 \leq$ the composite oxide/(the porous oxide+the composite oxide) $\leq 0.7$.

In a eighth aspect of the present invention, Pd is loaded on the composite oxide; and at least one of Pt and Rh is loaded on the support.

In a ninth aspect of the present invention, the support includes a particle having a particle diameter of 5 μm or more in an amount of less than 85% by volume.

According to the present invention, the coating layer of the present exhaust-gas-purifying catalyst hardly cracks and comes off after a severe durability test. In the coating layer, the ceria-zirconia composite oxide exhibits a high specific surface area, and is kept to be highly dispersed. Thus, the present exhaust-gas-purifying catalyst is good in terms of the durability.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
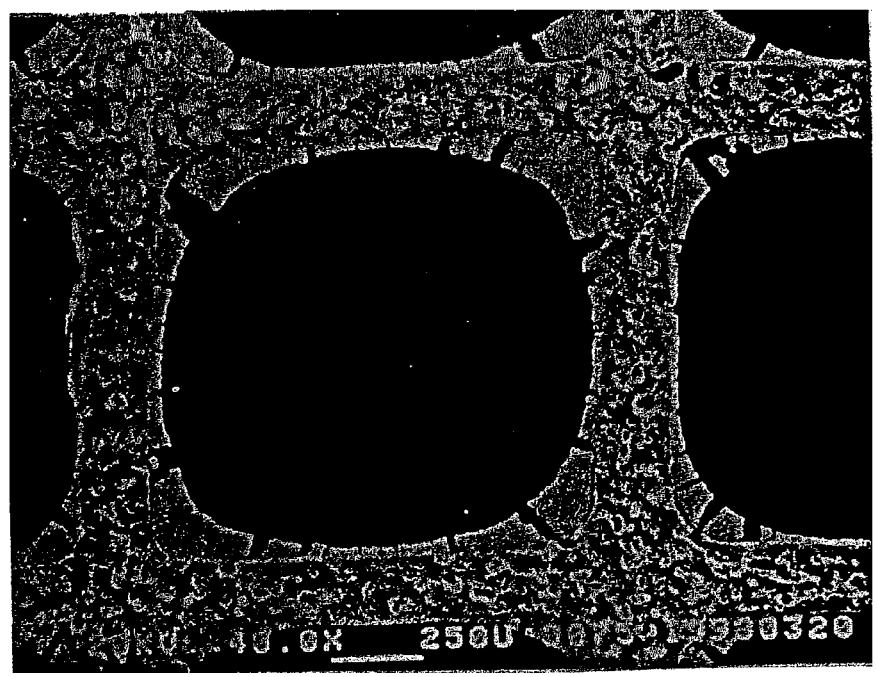
FIG. 1 is a microscope photograph for illustrating a cross section of a catalyst, in which a mixture whose mean particle diameter is 2 μm was used, after a durability test.

Having generally described the present invention, a further understanding can be obtained by reference to the specific preferred embodiments which are provided herein for the purpose of illustration only and not intended to limit the scope of the appended claims.

In the present invention, a support is used which comprises a mixture including a porous oxide particle and a composite oxide particle expressed by the formulae (1)–(4), and the mixture includes a particle having a particle diameter of 5 μm or more in an amount of 30% by volume or more, preferably 40% by volume or more, and furthermore preferably 50% by volume or more. When the mixture includes the particle having a particle diameter of 5 μm or more in an amount of 30% by volume or more, preferably 40% by volume or more, and furthermore preferably 50% by volume or more, the problems, such as the cracking in the coating layer and the coming-off thereof, are inhibited from happening even after the catalyst is subjected to a severe durability test in which it is heated at 1,000° C. for 20 hours.

In the mixture, when the particle having a particle diameter of 5 μm or more is included in an amount of more than 30% by volume, it is believed that the thermal contraction enlarges in the durability test, and that, as set forth in the following examples, the coating layer is cracked or come off. Note that the "particle diameter" means the average particle diameter of the support comprising mixtures.

Further, in the composition of the composite oxide, when the value "a" of the formulae (1)–(4) is less than 0.4, it is difficult to highly disperse the ceria-zirconia composite oxide. After the severe durability test, the specific surface area of the resulting ceria-zirconia composite oxide decreases, and thereby the purifying performance degrades. When the value "a" exceeds 2.5, the ceria-zirconia composite oxide decreases quantitatively so that a sufficient oxygen storing capability cannot be secured, and thereby favorable purifying performance cannot be obtained. The value of "a" is preferably in the range of from 0.4 to 2.0, more preferably, in the range of from 0.4 to 1.0, much more preferably, in the range of from 0.45 to 0.7.

When the value "b" of the formulae (1)–(4) is less than 0.2, the amount of the cerium is so less that a sufficient oxygen storing capability cannot be secured, and thereby favorable purifying performance cannot be obtained. When the value "b" exceeds 0.7, the thermal stability of the resulting ceria-zirconia composite oxide decreases, and thereby purifying performance degrades after the severe durability test. The value of "b" is preferably in the range of from 0.3 to 0.6, more preferably, in the range of from 0.4 to 0.6.

As set forth in the formulae (2) and (4), by further adding $Y_2O_3$ to the composite oxide, the durability of the ceria-zirconia composite oxide is further improved in oxidation atmospheres of 1,000° C. or more. The phase separation of the ceria-zirconia composite oxide is less likely to occur, and the activity of the noble metal is facilitated. When the value "c" of the formulae (2) and (4) is less than 0.01, the advantages resulting from the $Y_2O_3$ addition cannot be obtained. When the value "c" exceeds 0.2, the heat resistance of the ceria-zirconia composite oxide decreases, and the activity of the noble metal degrades.

Furthermore, as set forth in the formulae (3) and (4), by further adding $La_2O_3$ to the composite oxide, the durability of the ceria-zirconia composite oxide is further improved in oxidation atmospheres of 1,000° C. or more. The specific surface area of the ceria-zirconia composite oxide is maintained highly even after the severe durability test. When the value "d" of the formulae (3) and (4) is less than 0.005, the advantages resulting from the $La_2O_3$ addition cannot be obtained. When the value "d" exceeds 0.1, the heat resistance of the ceria-zirconia composite oxide decreases. In the formulae (2)–(4), at least one of $Y_2O_3$ and $La_2O_3$ can preferably be solved in the ceria-zirconia composite oxide and alumina.

Moreover, the composite oxides set forth in the formulae (1)–(4) can preferably further include at least one additive element selected from the group consisting of alkali metals, alkaline-earth metals, rare-earth elements and transition metal elements in a trace amount. By including such an additive element, the heat resistance of the ceria-zirconia composite oxide is furthermore improved. The addition amount of the additive element can preferably be 0.05 or less by molar ratio of the oxide with respect to the formulae (1)–(4). For example, when the additive element "M" is added, the formula (2) can be expressed by a formula, $(Al_2O_3)_a(CeO_2)_b(ZrO_2)_{1-b}(Y_2O_3)_c(MO)_e$, and the value of the molar ratio "e" falls in the range of from 0 to 0.05.

As for the alkali metals, Na, K, Li and Cs are preferred. As for the alkaline-earth metals, Mg, Ca, Sr and Ba are preferred. The rare-earth elements can be at least one member selected from the group consisting of La, Pr, Nd, Pm, Sm, Eu, Gd, Tb, Dy, Ho, Er, Tm, Yb and Lu. As for the transition metal elements, Fe, Cu, Ni, Co and Mn can be exemplified. One of these elements can be used, or two or more of them can be used simultaneously. When two or more of them are used, the additive elements can be added in a summed amount of 0.05 or less by molar ratio.

In the aforementioned composite oxide, at least $CeO_2$ and $ZrO_2$ can preferably form a solid solution, and a solubility of $ZrO_2$ can preferably be 50% or more, further preferably 70% or more, and furthermore preferably 80% or more in the solid solution. With this arrangement, the durability of the ceria-zirconia composite oxide is further improved in oxidation atmospheres of 1,000° C. or more. The phase separation of the ceria-zirconia composite oxide is further less likely to occur. The solubility is defined by the following equation:

Solubility (%)=100×(Amount of Oxide "B" Solved in Total Amount of Oxide "A")/(Total Amount of Oxide "B")

In this formula, it is supposed that the oxide "B" is uniformly solved into the total amount of the oxide "A".

For example, as for a solid solution of oxides comprising ceria and zirconia, ceria corresponds to the oxide "A", and zirconia corresponds to the oxide "B". The solubility is represented by the following formula (5):

Solubility (%)=100×(Amount of Zirconia solved in Total Amount of ceria)/(Total Amount of zirconia)     (5).

As for the solid solution of oxides comprising ceria and zirconia (Solubility being 100%), the relationship between a concentration of zirconia "x" (mol %) and a lattice constant "f" (Å; Angstrom) is represented by the following formula (6):

$$x=(5.411-\text{"f"})/0.00253 \quad (6)$$

(Values Cited from JCPDS (Joint Committee on Powder Diffraction Standards)) card.

In the composite oxide particle of the present invention, the average diameter of crystallite in the particle is not more than 10 nm. Such size of the crystallite is calculated by the formula of Sherrer based on a full width at half maximum of an X-ray diffraction peak as follows:

$$D=k\lambda/(\beta \cos \theta)$$

wherein k: a constant 0.9, λ: an X-ray wave length (Å), β: a diffraction ray width of a sample–a diffraction ray width of a standard sample (radian), and θ: a diffraction angle (degree).

When the average diameter of the crystallite is not more than 10 nm, the crystallite is not dense filling, and the particle has pores between crystallites. When the average diameter of the crystallite is more than 10 nm, a pore volume and a specific surface area are decreased, and the heat resistance is deteriorated. It is preferable that the specific surface area is not less than 10 m²/g, more preferably, not less than 20 m²/g, most preferably, not less than 50 m²/g.

In the particle of the present invention, as for the solid solution comprising ceria and zirconia, zirconium is substituted for a part of cerium while maintaining a fluorite structure of a cerium (IV) oxide to form a solid solution. In the solid solution, zirconium is fully solved, and a skeleton of zirconium is formed. As a result, a cubic structure of a crystallite is stable, and the cubic structure can be maintained even if a large amount of oxygen is discharged. Although such a mechanism is not clearly known, it is supposed that oxygen moves easily in the cubic structure so that it shows excellent oxygen storage ability as compared with a tetragonal structure or a monoclinic structure.

Since the average diameter of crystallite is not more than 10 nm, a grain boundary between crystallites increases, and an oxygen ion moves easily in the grain boundary. So, the oxygen adsorption and discharge rate is very high, and the oxygen storage ability is further improved. Since an oxygen adsorption and discharge is performed on the surface, when the specific surface area is large, namely, not less than 10 m²/g, the oxygen adsorption and discharge rate is very high, and the oxygen storage capability is excellent.

The composite oxide maintains the condition in which each constituent element is uniformly dispersed. The diameter of ceria-zirconia crystallite for constituting the composite oxide is A preferably not more than 5 nm. Even after the composite oxide support is subjected to heat treatment at 1000° C. for 5 hours, it is preferable that the diameter of ceria-zirconia crystallite is not more than 10 nm. While, not less than 60% of ceria-zirconia contained in the composite oxide are dispersed as the particle having particle diameter of not more than 30 nm, more preferably, not more than 20 nm. Furthermore, it is preferable that not less than 80% of ceria-zirconia contained in the composite oxide are dispersed as the particle having particle diameter of not more than 30 nm, more preferably, not more than 20 nm. Moreover, it is preferable that not less than 90% of ceria-zirconia contained in the composite oxide are dispersed as the particle having particle diameter of not more than 30 nm, more preferably, not more than 20 nm, most preferably, not more than 10 nm. According to results of SEM, TEM observation and EPMA elemental analysis, not less than 60% of ceria-zirconia are dispersed as the particle having particle diameter of not more than 30 μm.

In this case, "diameter of crystallite" or "particle diameter" means a clearance of alumina particle or aluminum atom which is existed between ceria-zirconia crystallite or particle. It may be a clearance of ceria-zirconia crystal or particle or atom which is dispersed in alumina particle or alumina crystallite. When the particle diameter is more than 30 nm, the ratio of ceria and/or zirconia, which effectively functions as composite oxide support catalyst, decreases. As a result, the activity of the noble metal and the oxygen storage capability as a catalyst are deteriorated, and the purifying performance of a three-way catalyst with respect to $NO_x$, HC and CO are degraded. Furthermore, when the solution of cerium oxide or zirconium oxide is not satisfactory, the oxygen storage capability and purifying performance are degraded. Both cases are not preferable.

As for the solid solution comprising ceria and zirconia, it is preferable that the ratio of the number of cerium atoms to the number of zirconium atoms in the particle is $0.3 \leq Zr/(Ce+Zr) \leq 0.8$, more preferably, $0.4 \leq Zr/(Ce+Zr) \leq 0.6$. When the content of zirconia is not more than 30 mol %, an action for forming a skeleton of zirconium in the crystallite of the solid solution is degraded. So, it is difficult to maintain a cubic fluorite structure if oxygen were released to some degree. As a result, oxygen cannot be released, and the oxygen storage capability is degraded. Furthermore, the oxygen storage ability depends on a change in number of valent of cerium (III) and cerium (IV). So, when the content of zirconium is not less than 80 mol %, an absolute amount of cerium is insufficient, and the oxygen storage capability is degraded.

A weight ratio of the porous oxide and the composite oxide can preferably be $0.30 \leq$ composite oxide/(composite oxide+porous oxide)$\leq 0.7$, and can be especially preferred to fall in a range of from 0.4 or more to 0.6 or less. When the value of {composite oxide/(composite oxide+porous oxide)} is less than 0.30, the ceria-zirconia composite oxide decreases quantitatively so that a sufficient oxygen storage-and-release ability cannot be secured, and thereby favorable purifying performance cannot be obtained. When the value of {composite oxide/(composite oxide+porous oxide)} exceeds 0.7, the loadability of the noble metal decreases and the noble metal is mainly loaded on the porous oxide. As a result, the co-catalytic actions, which are represented by the oxygen storage-and-release ability of the ceria-zirconia composite oxide, do not work effectively.

With the thus arranged support, after the support is burned at 1,000° C. for 5 hours, the mean crystal diameter of the solid solution comprising ceria and zirconia in the composite oxide is 10 nm or less by an X-ray diffraction measurement. Even after the severe durability test, the specific surface area of the ceria-zirconia composite oxide can be maintained highly, and thereby the present catalyst can maintain the high exhaust-gas-purifying performance.

As for the porous oxide constituting a part of the support, it is possible to use the porous oxides, such as alumina, zeolite, mordenite, FSM, alumina-zirconia composite oxide, silica, zirconia, titania and silica-alumina, which are used as the supports of the conventional exhaust-gas-purifying catalysts. The particle diameter of this porous oxide is not limited particularly. However, the porous oxide can be optimum which exhibits a specific surface area falling in a range of from 5 to 300 $m^2/g$. When the specific surface area falls outside this range, the loading ratio of the noble metal might deviate, and the activity might degrade. In addition, it might be further impossible to highly disperse the composite oxide particle.

As for the noble metal, it is possible to use the noble metals, such as Pt, Rh, Pd and Ir, which are used in the conventional exhaust-gas-purifying catalysts. The loading amount of the noble metal depends on the specific noble metals, however, it is preferable to load the noble metal in an amount of from 0.1 to 20% by weight with respect to the support. When the loading amount is less than the lower limit, no sufficient purifying activity can be obtained. When the loading amount is more than the upper limit, the purifying activity saturates, and the cost goes up.

In order to manufacture the composite oxide according to the present invention, it is possible to utilize a manufacturing process which is disclosed in Japanese Unexamined Patent Publication No. 10-182,155, for example. Namely, an oxide precursor is prepared from at least one of salt solutions of Al, Ce and Zr by a coprecipitation process in a short period of time, and it is burned in air. Thus, the composite oxide can be produced. In addition, Al, Ce and Zr can be supplied as an alkoxide to produce the oxide precursor by a sol-gel process.

When producing the present exhaust-gas-purifying catalyst, the particle of the aforementioned composite oxide and the particle of the porous oxide are mixed to make a mixture. Then, the mixture is mixed with a binder, such as an alumina sol, boehmite and aluminum nitrate, and water to make a slurry. By using the slurry, a coating layer is formed by wash-coating a honeycomb-shaped support substrate, which is formed of a metal foil or cordierite, and is dried and burned. Thereafter, by using a solution of a noble metal salt or a noble metal complex, a noble metal is loaded by adsorption. Thus, the present exhaust-gas-purifying catalyst can be produced. As for the binder, a silica sol, a zirconia sol or a titania sol can be used, or a salt solution of these metallic elements can be used.

Alternatively, a solution of a noble metal salt can be impregnated into the mixture of the composite oxide particle and the porous oxide particle to make a particle with a noble metal loaded. The resulting mixture then may be filtered and dried, or may be evaporated and dried. The particle thus loaded with a noble metal can be coated on a support substrate. Alternatively, in the preparation of an oxide precursor of the composite oxide, a noble metal salt can be coexisted with the solution of the oxide precursor to load a noble metal on the composite oxide, and the resulting product can be mixed with the porous oxide particle to make a particle with a noble metal loaded. In order to make a catalyst layer porous, an organic substance or carbon powder can be added to a slurry for forming the coating layer.

Hereinafter, the present invention will be described specifically with reference to examples and comparative examples.

EXAMPLE NO. 1

A high concentration aqueous solution (the solid content contained in the aqueous solution after burning being approximately 10% by weight) was prepared in which aluminum nitrate, cerium nitrate, zirconyl oxynitrate and lanthanum nitrate were solved by ratios of "a"=0.5, "b"=0.5 and "d"=0.007 in the formula (3). Into the solution, an aqueous hydrogen peroxide solution was added and stirred to mix. The aqueous hydrogen peroxide solution included hydrogen peroxide in an amount equivalent to 1.2 times of cerium. Thereafter, ammonia water was added in a short period of time to neutralize the resulting mixture. Thus, a suspension was prepared which contained precipitates of cerium hydroxide, zirconium hydroxide, lanthanum hydroxide and aluminum hydroxide. The suspension was calcined at 300° C. for 5 hours, and were further burned at 700° C. for 5 hour. The resulting particle was charged into a ball mill together with water, and was pulverized so that 50% by volume or more of its particles had a particle diameter of not more than 15 $\mu$m, thereby preparing a composite oxide particle. Note that the pulverized particle was burned at 700° C. herein, but can be burned at a temperature around 600 to 1,100° C. at which an oxide is formed.

Then, with respect to 100 parts by weight of the aforementioned composite oxide particle, 100 parts by weight of a commercially available heat-resistant activated alumina particle (specific surface area: 180 $m^2/g$), 20 parts by weight of aluminum nitrate nona-hydrate, 5 parts by weight of boehmite (AlO(OH)), and water were added. The water was added in such an amount that the solid content was 50% by weight after the burning. The mixture was mixed by an attrition mill for about 3 minutes, thereby preparing a slurry. The average particle diameter of the slurry after pulverizing was 7 μm.

A honeycomb-shaped support substrate, which was made from cordierite and had a volume of 1.3 L, was prepared, and was immersed into the slurry. Thereafter, the support substrate was taken out of the slurry, and was blown to remove the excessive slurry. After drying, the support substrate was burned at 650° C. for 1 hour, thereby preparing a coating layer. Note that the coating layer was formed in an amount of 200 g with respect to 1 L of the support substrate.

The support substrate having the coating layer was immersed into a platinum nitrate aqueous solution having a predetermined concentration, was blown to remove the excessive water droplets, and was dried. Thereafter, the support substrate was burned at 250° C. for 1 hour to load Pt. Subsequently, the support substrate was immersed into a rhodium nitrate aqueous solution having a predetermined concentration, and was loaded with Rh in the same manner. The loading amounts were 1.5 g for Pt and 0.3 g for Rh with respect to 1 L of the support substrate.

The resulting exhaust-gas-purifying catalyst of Example No. 1 was mounted on an exhaust pipe of a gasoline engine having a displacement of 2 L. Then, it was subjected to a facilitated durability driving test, in which the gasoline engine was run in a driving pattern simulating the European driving, for 100 hour. The maximum catalyst-bed temperature was about 1,000° C. during the test.

Thereafter, an exhaust gas was flowed through the exhaust-gas-purifying catalyst of Example No. 1. The exhaust gas simulates an exhaust gas, which is emitted during the simulated European driving. The exhaust gas was examined for the contents of HC, CO and $NO_x$ at the upstream side of the catalyst and the downstream side thereof simultaneously, and the average conversion of HC, CO and $NO_x$ was calculated. The result is set forth in Table 1.

EXAMPLE NO. 2

Except that the activated alumina particle working as the porous oxide was replaced by the same amount of a zirconia particle having a specific surface area of 50 m²/g, and that the aluminum nitrate and boehmite were replaced by 100 parts by weight of a zirconia sol ($ZrO_2$ content: 10% by weight), an exhaust-gas-purifying catalyst of Example No. 2 was prepared in the same manner as Example No. 1. The average conversion was measured in the same manner as Example No. 1. The result is set forth in Table 1.

EXAMPLE NO. 3

Except that a high-concentration aqueous solution was used in which aluminum nitrate, cerium nitrate and zirconyl oxynitrate were solved by ratios of "a"=0.5 and "b"=0.33 in the formula (3), an exhaust-gas-purifying catalyst of Example No. 3 was prepared in the same manner as Example No. 1. The average conversion was measured in the same manner as Example No. 1. The result is set forth in Table 1.

EXAMPLE NO. 4

Except that a high-concentration aqueous solution was used in which aluminum nitrate, cerium nitrate, zirconyl oxynitrate and yttrium nitrate were solved by ratios of "a"=0.5, "b"=0.6 and "c"=0.05 in the formula (2), an exhaust-gas-purifying catalyst of Example No. 4 was prepared in the same manner as Example No. 1. The average conversion was measured in the same manner as Example No. 1. The result is set forth in Table 1.

EXAMPLE NO. 5

Except that a high-concentration aqueous solution was used in which aluminum nitrate, cerium nitrate, zirconyl oxynitrate, yttrium nitrate and lanthanum nitrate were solved by ratios of "a"=0.5, "b"=0.5, "c"=0.05 and "d"=0.015 in the formula (4), an exhaust-gas-purifying catalyst of Example No. 5 was prepared in the same manner as Example No. 1. The average conversion was measured in the same manner as Example No. 1. The result is set forth in Table 1.

EXAMPLE NO. 6

A composite oxide particle was prepared in the same manner as Example No. 1. Into the composite oxide particle, a palladium nitrate aqueous solution having a predetermined concentration was impregnated in a predetermined amount. The composite oxide particle was filtered, dried and burned at 250° C. to load Pd. With respect to 100 parts by weight of the resulting composite oxide particle with Pd loaded, 100 parts by weight of an activated alumina particle, working as the porous oxide particle and being the same as that of Example No. 1, 20 parts by weight of aluminum nitrate nona-hydrate, and 5 parts by weight of boehmite were added, and were mixed by an attrition mill for about 3 minutes, thereby preparing a slurry.

By using the resulting slurry, a coating layer was formed on a support substrate in the same manner as Example No. 1. Subsequently, the support substrate was immersed into a rhodium nitrate aqueous solution having a predetermined concentration, and was taken up therefrom. Then, the support substrate was blown to remove the excessive water droplets, and was dried. Finally, the support substrate was loaded with Rh. Thus, an exhaust-gas-purifying catalyst of Example No. 6 was prepared. The loading amounts were 1.5 g for Pd and 0.3 g for Rh with respect to 1 L of the support substrate. The average conversion was measured in the same manner as Example No. 1. The result is set forth in Table 1.

EXAMPLE NO. 7

A high-concentration aqueous solution was prepared in which aluminum nitrate, cerium nitrate, zirconyl oxynitrate and lanthanum nitrate were solved by ratios of "a"=0.5, "b"=0.5 and "d"=0.015 in the formula (3). Except that the high-concentration aqueous solution was used, and that mordenite was mixed, an exhaust-gas-purifying catalyst of Example No. 7 was prepared in the same manner as Example No. 6. The loading amounts were 1.5 g for Pd and 0.3 g for Rh with respect to 1 L of the support substrate. The average conversion was measured in the same manner as Example No. 1. The result is set forth in Table 1.

EXAMPLE NO. 8

A high-concentration aqueous solution was prepared in which aluminum nitrate, cerium nitrate, zirconyl oxynitrate and lanthanum nitrate were solved by ratios of "a"=0.5, "b"=0.5 and "d"=0.015 in the formula (3), and in which palladium nitrate was further solved. Except that the high-concentration aqueous solution was used, a composite oxide particle loaded with Pd was prepared in the same manner as Example No. 6.

With respect to 100 parts by weight of the composite oxide particle loaded with Pd, 100 parts by weight of an activated alumina particle, working as the porous oxide particle and being the same as that of Example No. 1, 20 parts by weight of aluminum nitrate nona-hydrate, and 5 parts by weight of boehmite were added, and were mixed by an attrition mill for about 3 minutes, thereby preparing a slurry.

By using the resulting slurry, a coating layer was formed on a support substrate in the same manner as Example No. 1. Subsequently, the support substrate was loaded with Pt and Rh. Thus, an exhaust-gas-purifying catalyst of Example No. 8 was prepared. The loading amounts were 1.5 g for Pd, 1.5 g for Pt and 0.3 g for Rh with respect to 1 L of the support substrate. The average conversion was measured in the same manner as Example No. 1. The result is set forth in Table 1.

EXAMPLE NO. 9

A high-concentration aqueous solution was prepared in which aluminum nitrate, cerium nitrate, zirconyl oxynitrate and lanthanum nitrate were solved by ratios of "a"=0.5, "b"=0.5 and "d"=0.015 in the formula (3), and in which palladium nitrate was further solved. Except that the high-concentration aqueous solution was used, a composite oxide particle loaded with Pd was prepared in the same manner as Example No. 6.

With respect to 100 parts by weight of the composite oxide particle loaded with Pd, 50 parts by weight of an activated alumina particle, being the same as that of Example No. 1, 50 parts by weight of an alumina-zirconia composite oxide particle, working as the porous oxide particle and having a specific surface area of 70 m$^2$/g, 20 parts by weight of aluminum nitrate nona-hydrate, and 5 parts by weight of boehmite were added, and were mixed by an attrition mill for about 3 minutes, thereby preparing a slurry.

By using the resulting slurry, a coating layer was formed on a support substrate in the same manner as Example No. 1. Subsequently, the support substrate was loaded with Pt and Rh. Thus, an exhaust-gas-purifying catalyst of Example No. 9 was prepared. The loading amounts were 1.5 g for Pd, 1.5 g for Pt and 0.3 g for Rh with respect to 1 L of the support substrate. The average conversion was measured in the same manner as Example No. 1. The result is set forth in Table 1.

COMPARATIVE EXAMPLE NOS. 1 THROUGH 5

Except that a high-concentration aqueous solution was used in which aluminum nitrate, cerium nitrate and zirconyl oxynitrate were solved by ratios of "a"=2.6, "b"=0.5 and "d"=0 in the formula (3), an exhaust-gas-purifying catalyst of Comparative Example No. 1 was prepared in the same manner as Example No. 1. The average conversion was measured in the same manner as Example No. 1. The result is set forth in Table 1.

In Table 1, exhaust-gas-purifying catalysts of Comparative Example Nos. 2 through 5 are listed which were prepared in the same manner as those of Example Nos. 1 through 4 except that the values "a" through "d" fell outside the claimed ranges of the present invention.

TABLE 1

| | Composition of Composite Oxide | | | | | | Nobel Metal Loading Amount after | | Average Conversion (%) | Noble Metal Loading Amount to Composite Oxide Particle & & (Loading Method) |
|---|---|---|---|---|---|---|---|---|---|---|
| | $Al_2O_3$ "a" | $CeO_2$ "b" | $ZrO_2$ "1-b" | $Y_2O_3$ "c" | $La_2O_3$ "d" | Porous Oxide | Forming Coating Layer & (Loading Method) | Binder | | |
| Ex. No. 1 | 0.5 | 0.5 | 0.5 | None | 0.007 | $Al_2O_3$ | Pt: 1.5 g/L (Adsorption) Rh: 0.3 g/L (Adsorption) | Aluminum Nitrate & Boehmite | 98 | None |
| Ex. No. 2 | 0.5 | 0.5 | 0.5 | None | 0.007 | $ZrO_2$ | Pt: 1.5 g/L (Adsorption) Rh: 0.3 g/L (Adsorption) | Zirconia Sol | 95 | None |
| Ex. No. 3 | 0.5 | 0.33 | 0.6 | None | 0.007 | $Al_2O_3$ | Pt: 1.5 g/L (Adsorption) Rh: 0.3 g/L (Adsorption) | Aluminum Nitrate & Boehmite | 97 | None |
| Ex. No. 4 | 0.5 | 0.6 | 0.4 | 0.05 | None | $Al_2O_3$ | Pt: 1.5 g/L (Adsorption) Rh: 0.3 g/L (Adsorption) | Aluminum Nitrate & Boehmite | 96 | None |
| Ex. No. 5 | 0.5 | 0.5 | 0.5 | 0.05 | 0.015 | $Al_2O_3$ | Pt: 1.5 g/L (Adsorption) Rh: 0.3 g/L (Adsorption) | Aluminum Nitrate & Boehmite | 95 | None |
| Ex. No. 6 | 0.5 | 0.5 | 0.5 | None | 0.007 | $Al_2O_3$ | Rh: 0.3 g/L (Adsorption) | Aluminum Nitrate & Boehmite | 99 | Pd: 1.5 g/L (Impregnation) |
| Ex. No. 7 | 0.5 | 0.5 | 0.5 | None | 0.015 | Mordenite | Rh: 0.3 g/L (Adsorption) | Aluminum Nitrate & Boehmite | 99 | Pd: 1.5 g/L (Impregnation) |
| Ex. No. 8 | 0.5 | 0.5 | 0.5 | None | 0.015 | $Al_2O_3$ | Pt: 1.5 g/L (Adsorption) Rh: 0.3 g/L (Adsorption) | Aluminum Nitrate & Boehmite | 99 | Pd: 1.5 g/L (Coprecipitation) |
| Ex. No. 9 | 0.5 | 0.5 | 0.5 | None | 0.015 | $Al_2O_3$ & $Al_2O_3$—$ZrO_2$ | Pt: 1.5 g/L (Adsorption) Rh: 0.3 g/L (Adsorption) | Aluminum Nitrate & Boehmite | 99 | Pd: 1.5 g/L (Coprecpitation) |
| Comp. Ex. No. 1 | 2.6 | 0.5 | 0.5 | None | None | $Al_2O_3$ | Pt: 1.5 g/L (Adsorption) Rh: 0.3 g/L (Adsorption) | Aluminum Nitrate & Boehmite | 86 | None |
| Comp. Ex. No. 2 | 0.3 | 0.5 | 0.5 | None | None | $Al_2O_3$ | Pt: 1.5 g/L (Adsorption) Rh: 0.3 g/L (Adsorption) | Aluminum Nitrate & Boehmite | 90 | None |
| Comp. | 0.5 | 0.15 | 0.85 | None | None | $Al_2O_3$ | Pt: 1.5 g/L (Adsorption) | Aluminum | 88 | None |

TABLE 1-continued

| | Composition of Composite Oxide | | | | | | Nobel Metal Loading Amount after | | Average | Noble Metal Loading Amount to Composite |
|---|---|---|---|---|---|---|---|---|---|---|
| | $Al_2O_3$ "a" | $CeO_2$ "b" | $ZrO_2$ "1-b" | $Y_2O_3$ "c" | $La_2O_3$ "d" | Porous Oxide | Forming Coating Layer & (Loading Method) | Binder | Conversion (%) | Oxide Particle & & (Loading Method) |
| Ex. No. 3 | | | | | | | Rh: 0.3 g/L (Adsorption) | Nitrate & Boehmite | | |
| Comp. Ex. No. 4 | 0.5 | 0.5 | 0.5 | 0.21 | None | $Al_2O_3$ | Pt: 1.5 g/L (Adsorption) Rh: 0.3 g/L (Adsorption) | Aluminum Nitrate & Boehmite | 85 | None |
| Comp. Ex. No. 5 | 0.5 | 0.5 | 0.5 | None | 0.12 | $Al_2O_3$ | Pt: 1.5 g/L (Adsorption) Rh: 0.3 g/L (Adsorption) | Aluminum Nitrate & Boehmite | 83 | None |

<Evaluation>

It is apparent from Table 1 that the exhaust-gas-purifying catalysts of the Examples exhibited remarkably high average conversions of from 95 to 99% even after the severe durability test, which was carried out at 1,000° C. for 100 hours, and were extremely superior to the catalysts of Comparative Example Nos. 1 through 5 in terms of the durability.

According to the results of the X-ray diffraction, the cerium and zirconium formed solid solutions, which were substantially homogeneous, in the catalysts of the Examples. The primary particle diameters were about 7 nm. The solubilities of $ZrO_2$ were 85% or more.

The cross sections of the coating layers were grounded, and were observed with an electron microscope. As a result, the following were confirmed: the solid solutions of the cerium and zirconium were distributed in the alumina in a highly dispersed manner; and the composite oxide particles were dispersed so that they were surrounded by the alumina particle or the alumina-zirconia particle.

The coating layers were scraped off, and the specific surface areas of the resulting particles were measured. As a result, they exhibited remarkably high specific surface areas. For instance, the catalyst of Example No. 2 exhibited a specific surface area of about 18 m²/g, and the other Example No. 1 and Example Nos. 3 through 9 exhibited specific surface areas of 70 m²/g or more. The oxygen storage-and-release abilities of the particles were measured. As a result, the following were confirmed: they exhibited such high values that the oxygen storage-and-release abilities were 0.09 mol per 1 mol of cerium at 300° C.

A method for measuring the oxygen storage capability was as follows. A catalyst was filled in silica tube, and the catalyst was measured by an infrared image furnace at 300° C. Concretely, 1% $H_2$+He gas (100 cc/min.) and 1% $O_2$+He gas (50 cc/min.) were alternatively flowed into 0.1 to 1 g of catalyst at several seconds to several minutes (mainly 2.5 minutes) intervals. The outlet gas of the catalyst was analyzed by quadrupole-type mass spectrometer, and measured at the predetermined temperature for 13 minutes. At 2nd cycle of the predetermined temperature, an oxygen amount stored in the catalyst was measured by time delay until when $H_2$ content reaches 0.5 vol % after changing from $O_2$+He gas to $H_2$+He gas.

According to the above-described results, the exhaust-gas-purifying catalysts of the Examples could maintain the high purifying performance even after the durability test because of the following operations: the ceria-zirconia solid solutions were highly dispersed, and the specific surface areas were large. Accordingly, the catalysts exhibited the high oxygen storage-and-release abilities. It is believed that the advantages resulted from the arrangement that the values of the molar ratios "a" through "d" of the composite oxide fell in the claimed ranges of the present invention.

EXAMPLE NOS. 10 THROUGH 28 and COMPARATIVE EXAMPLE NOS. 6 THROUGH 10

Except that the compositions differed from that of Example No. 1, the following 25 particles set forth in Table 2 below were prepared in the same manner as those of Example Nos. 1 through 4. The resulting particles were heated under the conditions recited in Table 2, e.g., in the range of from 950 to 1,100° C.

Table 2 summarizes the solubility of $ZrO_2$ in the solid solution of the ceria-zirconia in each of the samples, the mean crystallite diameter of the ceria-zirconia solid solution contained in each of the samples, and the specific surface area of the alumina-ceria-zirconia composite oxide. Note that Example No. 23 was synthesized by two processes, e.g., the process of Example No. 1 and an ordinary sol-gel process and was examined for the characteristics. Regardless of the synthesis processes, Example No. 23 exhibited the substantially same results as those of the other Examples.

TABLE 2

| | Composition of Composite Oxide | | | | | Solubility of $ZrO_2$ in (Ce, Zr)$O_2$ Solid Solution (%) | |
|---|---|---|---|---|---|---|---|
| | $Al_2O_3$ "a" | $CeO_2$ "b" | $ZrO_2$ "1-b" | $Y_2O_3$ "c" | $La_2O_3$ "d" | 1,000° C., 20 hr. | 1,100° C., 20 hr. |
| Ex. No. 10 | 0.5 | 0.5 | 0.5 | 0.015 | None | 94 | 64 |
| Ex. No. 11 | 0.5 | 0.5 | 0.5 | 0.05 | None | 108 | 108 |
| Ex. No. 12 | 0.5 | 0.5 | 0.5 | 0.15 | None | 108 | 108 |
| Ex. No. 13 | 0.5 | 0.5 | 0.5 | None | 0.005 | 70 | 54 |

TABLE 2-continued

| Ex. No. | | | | | | | |
|---|---|---|---|---|---|---|---|
| Ex. No. 14 | 0.5 | 0.5 | 0.5 | None | 0.015 | 86 | 64 |
| Ex. No. 15 | 0.5 | 0.5 | 0.5 | None | 0.025 | 86 | 73 |
| Ex. No. 16 | 0.5 | 0.5 | 0.5 | 0.015 | 0.005 | 97 | 72 |
| Ex. No. 17 | 0.5 | 0.5 | 0.5 | 0.015 | 0.015 | 94 | 92 |
| Ex. No. 18 | 0.5 | 0.5 | 0.5 | 0.015 | 0.025 | 94 | 86 |
| Ex. No. 19 | 0.5 | 0.5 | 0.5 | 0.05 | 0.005 | 110 | 108 |
| Ex. No. 20 | 0.5 | 0.5 | 0.5 | 0.05 | 0.015 | 102 | 106 |
| Ex. No. 21 | 0.5 | 0.5 | 0.5 | 0.05 | 0.025 | 102 | 100 |
| Ex. No. 22 | 0.5 | 0.5 | 0.5 | 0.15 | 0.015 | 105 | 100 |
| Ex. No. 23 | 1.0 | 0.5 | 0.5 | None | 0.005 | 67 | 52 |
| Ex. No. 24 | 2.0 | 0.5 | 0.5 | 0.015 | 0.005 | 96 | 70 |
| Ex. No. 25 | 1.0 | 0.5 | 0.5 | 0.05 | None | 106 | 104 |
| Ex. No. 26 | 1.5 | 0.5 | 0.5 | 0.15 | None | 107 | 107 |
| Ex. No. 27 | 2.5 | 0.5 | 0.5 | 0.05 | None | 103 | 104 |
| Ex. No. 28 | 0.5 | 0.5 | 0.5 | None | None | 63 | 45 |
| Comp. Ex. No. 6 | 0.5 | 0.5 | 0.5 | 0.25 | None | 102 | 100 |
| Comp. Ex. No. 7 | 0.5 | 0.5 | 0.5 | 0.25 | None | 100 | 97 |
| Comp. Ex. No. 8 | None | 0.5 | 0.5 | 0.015 | 0.015 | 96 | 66 |
| Comp. Ex. No. 9 | 0.3 | 0.5 | 0.5 | 0.015 | None | 96 | 66 |
| Comp. Ex. No. 10 | 3.0 | 0.5 | 0.5 | 0.015 | None | 94 | 70 |

| | Mean Particle Dia. of (Ce, Zr)O$_2$ Solid Solution (nm) | | Specific Surface Area of Alumina-Ceria-Zirconia Composite Oxide | | | Evaluation Result of Oxygen Storage-and-Release Ability (Relative Value) |
|---|---|---|---|---|---|---|
| | 1,000° C., 20 hr. | 1,100° C., 20 hr. | 950° C., 5 hr. | 1,000° C., 20 hr. | 1,100° C., 20 hr. | |
| Ex. No. 10 | 4.9 | 8.5 | 39 | 27 | 13 | 85 |
| Ex. No. 11 | 7.5 | 8.5 | 39 | 26 | 12 | 100 |
| Ex. No. 12 | 9.8 | 14.0 | 38 | 24 | 12 | 100 |
| Ex. No. 13 | 6.1 | 10.0 | 40 | 25 | 12 | 67 |
| Ex. No. 14 | 5.5 | 10.0 | 41 | 25 | 11 | 73 |
| Ex. No. 15 | 6.4 | 10.0 | 42 | 26 | 11 | 80 |
| Ex. No. 16 | 5.8 | 8.5 | 40 | 28 | 14 | 81 |
| Ex. No. 17 | 5.9 | 7.8 | 40 | 24 | 12 | 90 |
| Ex. No. 18 | 6.6 | 11.0 | 45 | 26 | 11 | 83 |
| Ex. No. 19 | 8.1 | 8.8 | 40 | 27 | 14 | 92 |
| Ex. No. 20 | 8.0 | 11.0 | 43 | 28 | 14 | 97 |
| Ex. No. 21 | 7.8 | 10.7 | 47 | 26 | 14 | 90 |
| Ex. No. 22 | 7.8 | 14.7 | 41 | 22 | 12 | 88 |
| Ex. No. 23 | 5.3 | 9.0 | 62 | 42 | 20 | 65 |
| Ex. No. 24 | 5.7 | 8.2 | 85 | 55 | 27 | 58 |
| Ex. No. 25 | 5.5 | 8.0 | 60 | 40 | 19 | 72 |
| Ex. No. 26 | 8.2 | 12.0 | 61 | 41 | 20 | 63 |
| Ex. No. 27 | 5.5 | 8.0 | 92 | 60 | 31 | 58 |
| Ex. No. 28 | 6.4 | 11.0 | 39 | 26 | 11 | 60 |
| Comp. Ex. No. 6 | 9.8 | 16.5 | 36 | 23 | 6 | 98 |
| Comp. Ex. No. 7 | 10.2 | 17.6 | 34 | 19 | 7 | 32 |
| Comp. Ex. No. 8 | 13.0 | 21.5 | 2 | 1 | 0 | 15 |
| Comp. Ex. No. 9 | 10.1 | 18.0 | 21 | 13 | 8 | 30 |
| Comp. Ex. No. 10 | 8.0 | 11.0 | 103 | 65 | 34 | 18 |

<Evaluation>

The catalysts or particles of Example Nos. 10 through 28 whose compositions were fell in the claimed ranges of the present invention make it simultaneously possible to enlarge the solubility of $ZrO_2$, to enlarge the specific surface area, and to reduce the mean crystallite particle diameter.

With regard to the catalysts or particles of Comparative Example Nos. 6 through 10, the solubility of $ZrO_2$ was almost the same level as those of Examples after being heated at 1,100° C. However, the mean crystallite diameter of the ceria-zirconia solid solution was enlarged, and the specific surface area was decreased as shown in Comparative Example Nos. 6 through 9. In particular, in case of Comparative Example No. 10 whose alumina content was large, since the ceria content was reduced relatively in the catalyst, the oxygen storage capability was exhibited less. As a result, high catalytic performance could not be obtained in the fluctuating oxidation-reduction atmospheres.

In Table 2, some of the values exceed 100 in the solubility. This results from the fact that the solubility was obtained simply by the aforementioned equation (6) based on the 311 diffraction peak of the ceria-zirconia solid solution (cubic crystalline structure). Namely, since Y and La solve in both of the alumina solid solution and the ceria-zirconia solid solution, the lattice constant of the ceria-zirconia solid solution is varied by the difference of the ion radii of Y and La accordingly. However, since the influence was 10% or less, the solubilities were calculated while neglecting the influence for simplicity.

A method for measuring the oxygen storage capability was as follows.

1 g of platinum was loaded on 100 g of each composite oxide of Example Nos. 10 to 28 and Comparative Example Nos. 6 to 10 by an impregnation method. The catalyst particles were pressed and molded to prepare pellet catalysts having the diameter of 0.5 to 1 mm. By using 0.3 g of each catalyst, the oxygen storage capability was measured in the same manner as that of Example No. 2. According to the result of such measurement, the oxygen storage capability per unit weight was calculated and shown as relative value in Table 2 in the condition that the oxygen storage capability of the catalyst in which the composite oxide of Example No. 11 was used was 100.

It is apparent from Table 2 that the exhaust-gas-purifying catalysts of the Examples exhibited high solubilities and high oxygen storage-and-release abilities.

<Influence of Particle Diameter>

Then, the influence of the particle diameter of the mixture was surveyed.

Except that the time for pulverizing and mixing by the attrition mill was changed, 4 mixtures whose mean particle diameters were 2 µm, 5 µm, 7.7 µm and 8.8 µm were prepared in the same manner as Example No. 1. By using each of the mixtures, 4 exhaust-gas-purifying catalysts were prepared in the same manner as Example No. 1.

These exhaust-gas-purifying catalysts were mounted on the exhaust pipe in the same manner as Example No. 1, and were subjected to the facilitated durability driving test for 10 hours similarly. Thereafter, the cross sections of the catalysts were observed with an electron microscope. As a result, in the catalyst, which used the mixture whose mean particle diameter was 2 µm, large cracks were observed in the coating layer as shown in FIG. 1. The coating layer came off in places.

Figure 2:
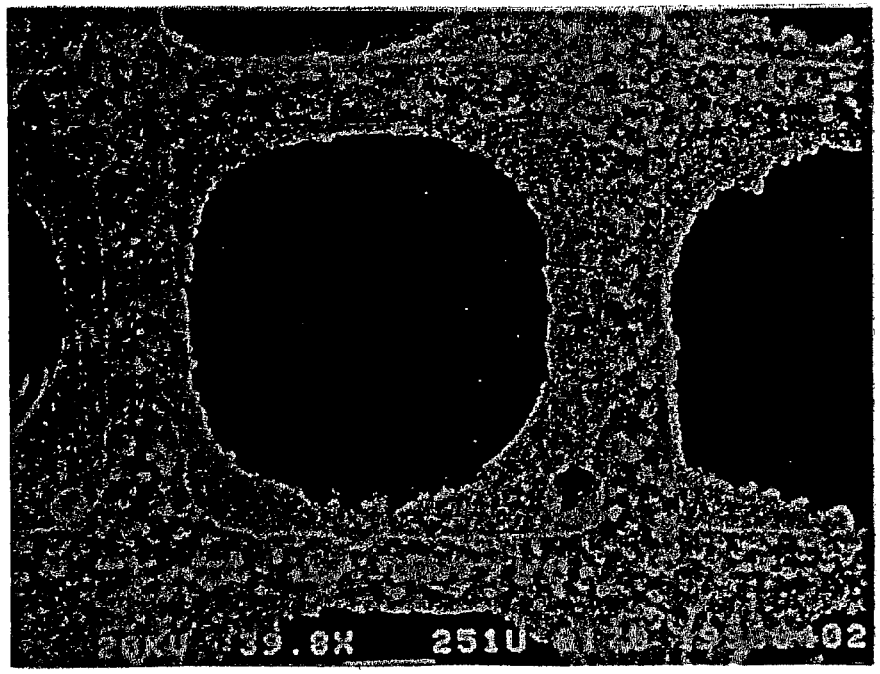
FIG. 2 is a microscope photograph for illustrating a cross section of a catalyst, in which a mixture whose mean particle diameter is 5 m was used, after a durability test and air was subsequently blown to the catalyst.

Then, air was blown to the end surfaces of the catalysts at a pressure of 0.1 MPa. The cross sections of the catalysts were observed with an electron microscope. As a result, in the catalyst, which used the mixture whose mean particle diameter was 5 µm, cracks were observed partially as shown in FIG. 2. The coating layer came off in places very limitedly.

Figure 3:
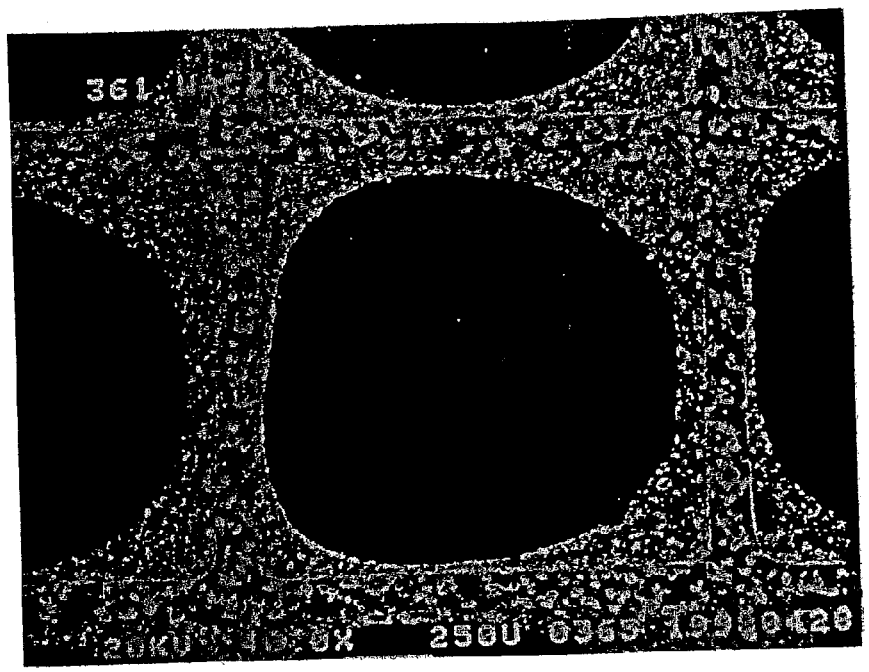
FIG. 3 is a microscope photograph for illustrating a cross section of a catalyst, in which a mixture whose mean particle diameter is 7.7 μm was used, after a durability test and air was subsequently blown to the catalyst.
Figure 4:
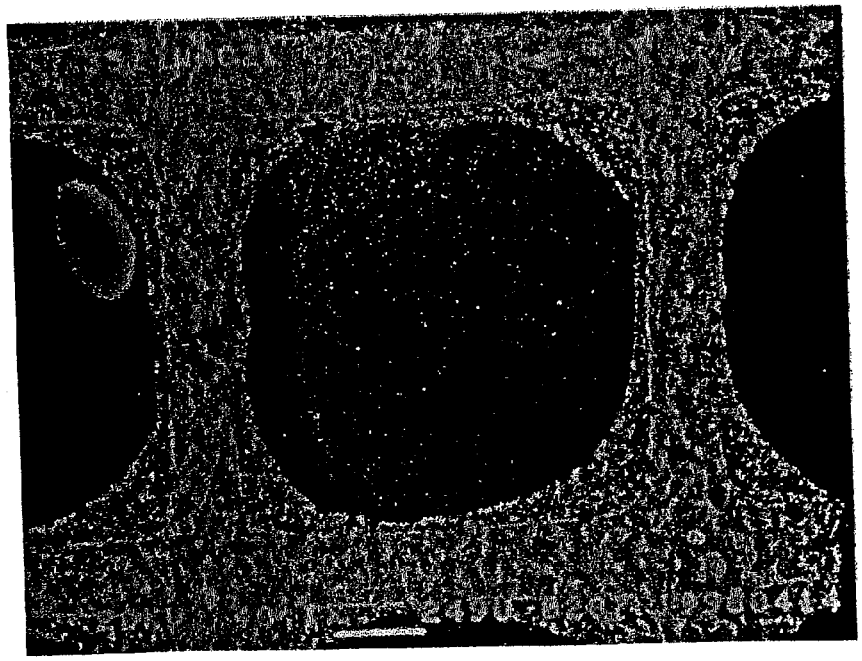
FIG. 4 is a microscope photograph for illustrating a cross section of a catalyst, in which a mixture whose mean particle diameter is 8.8 μm was used, after a durability test and air was subsequently blown to the catalyst.

Moreover, in the catalysts, which used the mixtures whose mean particle diameters were 7.7 µm and 8.8 µm, no cracks and coming-off were observed in the coating layers, as shown in FIGS. 3 and 4, after the catalysts were vibrated and were blown by the air. The catalysts were good in terms of the strength of the coating layers.

These 4 mixtures and the other 4 mixtures were examined for the particle diameter distribution by using a laser diffraction/scattering type particle diameter distribution measuring apparatus, and for the extent of cracks and coming-off. Results are set forth in Table 3 below.

TABLE 3

| Mean Particle Dia. (µm) | 2.0 | 3.2 | 4.0 | 5.0 | 7.7 | 8.8 | 12.0 | 14.8 |
|---|---|---|---|---|---|---|---|---|
| Particle Dia. (µm) | | | | | | | | |
| 30 µm or more | 0.0 | 0.0 | 0.0 | 0.0 | 0.5 | 0.8 | 1.0 | 11.7 |
| 20 µm or more | 0.0 | 0.0 | 0.1 | 0.1 | 4.5 | 10.2 | 16.7 | 32.3 |
| 10 µm or more | 0.0 | 2.5 | 4.2 | 8.5 | 32.7 | 45.8 | 60.1 | 68.0 |
| 5 µm or more | 4.9 | 27.2 | 34.3 | 50.0 | 75.9 | 80.0 | 82.7 | 85.5 |
| 3 µm or more | 26.7 | 52.9 | 65.5 | 76.5 | 92.4 | 91.8 | 90.9 | 93.0 |
| 2 µm or more | 50.0 | 65.3 | 78.6 | 90.8 | 99.4 | 98.3 | 94.5 | 96.6 |
| 1 µm or more | 80.2 | 84.3 | 90.4 | 99.5 | 100.0 | 99.5 | 98.1 | 99.6 |
| Extent of Coming-Off and Cracks | Large | Large | Less | Least | None | None | Least | Medium |

<Evaluation>

According to the results, it is understood that the cracks and coming-off were less likely to occur when the particles having a particle diameter of 5 µm or more were contained in the mixture in an amount of 30% by volume or more. It is further preferable to contain the particles having a particle diameter of 5 µm or more in an amount of 40% by volume or more, furthermore preferably in an amount of 50% by volume or more. However, it is not the case that the larger the particle diameter was, the better performance the mixtures exhibited. For instance, when the particles having a particle diameter of 5 µm or more were contained in an amount of 85% or more, there arose a problem in that the coming-off were more likely to occur adversely. The mean particle diameter is in the range of from 3.5 to 20 µm, preferably, 4.5 to 14 µm, more preferably, in the range of from 5.5 to 11 µm, much more preferably, in the range of from 7 to 9 µm. Such relationship between particle diameter and coming-off and cracks were also observed with respect to other compositions of composite oxides, e.g. Examples 4, 5 and 28.

EXAMPLE NOS. 29 THROUGH 32 and COMPARATIVE EXAMPLE NOS. 11 THROUGH 13

Table 4 summarizes the results of the experiments which were carried out in attention to the weight ratio of the porous oxide and composite oxide in the support. Except that the composite oxide having the same composition ratio as that of Example No. 28 was used, and that each weight ratio of composite oxide and γ—$Al_2O_3$ was changed, the catalysts for purifying exhaust gases were prepared in the same manner as that of Example No. 1. The catalysts were subjected to the same facilitated durability driving test as that of Example No. 1 for 100 hours.

The peeling-off ratio of the coating layer was calculated by the difference in weight of the catalyst between before and after the durability test. The result was shown in Table 4. The catalyst after the durability test was arranged in an evaluation apparatus, and the oxygen storage capability at 300° C. was measured. The result was also shown in Table 4.

Each catalyst after the durability test was attached to an exhaust system of 2-liter engine, and the temperature of an inlet gas was gradually increased from room temperature, and the purification performance of HC and $NO_x$ was measured. Then, each 50% purification temperature was calculated, and the result was shown in Table 4.

Furthermore, the coating layer was picked off from a part of each catalyst, and the specific area was measured. The result was shown in Table 4.

TABLE 4

| | Composite Oxide/ (Composite Oxide + γ-$Al_2O_3$) | Coming-off Ratio of Coating Layer (%) | Oxygen Storage-and-Release Ability (mol-$O_2$/mol-Ce) | 50% Purification Temperature (° C.) HC | 50% Purification Temperature (° C.) $NO_x$ | Specific Surface Area ($m^2$/g) |
|---|---|---|---|---|---|---|
| Ex. No. 29 | 0.625 | 2.5 | 0.11 | 306 | 299 | 75 |
| Ex. No. 30 | 0.5 | 0.5 | 0.09 | 298 | 307 | 80 |
| Ex. No. 31 | 0.4 | 0.5 | 0.08 | 301 | 305 | 92 |
| Ex. No. 32 | 0.35 | 1.0 | 0.05 | 310 | 312 | 108 |
| Comp. Ex. No. 11 | 0.20 | 0.5 | 0.04 | 345 | 340 | 123 |
| Comp. Ex. No. 12 | 0.71 | 14.0 | 0.07 | 330 | 343 | 65 |
| Comp. Ex. No. 13 | 1.0 | 8.0 | 0.08 | 313 | 318 | 40 |

<Evaluation>

As apparent from Table 4, when the weight ratio of composite oxide and γ—$Al_2O_3$ was set to 0.3≦composite oxide/(composite oxide+γ—$Al_2O_3$)≦0.7, preferably, 0.4≦composite oxide/(composite oxide+γ—$Al_2O_3$)≦0.6, the peeling-off ratio was controlled, and high oxygen storage capacity and an increase in 50% purification temperature was controlled. Further, with respect to other composition of composite oxides, e.g. Examples 1, 4 and 5, the same results were obtained.

Having now fully described the present invention, it will be apparent to one of ordinary skill in the art that many changes and modifications can be made thereto without departing from the spirit or scope of the present invention as set forth herein including the appended claims.

What is claimed is:

1. A catalyst, comprising:
   (a) a support including a mixture containing a porous oxide and a composite oxide; and
   (b) a noble metal loaded on the support, wherein
      the composite oxide is expressed by a formula selected from the group consisting of:
      (i) $(Al_2O_3)_a(CeO_2)_b(ZrO_2)_{1-b}$, in which the values a and b are molar ratios falling in the range of 0.4≦a≦2.5, and 0.2≦b≦0.7, respectively;
      (ii) $(Al_2O_3)_a(CeO_2)_b(ZrO_2)_{1-b}(Y_2O_3)_c$, in which the values a, b and c are molar ratios falling in the range of 0.4≦a≦2.5, 0.2≦b≦0.7, and 0.01≦c≦0.2, respectively;
      (iii) $(Al_2O_3)_a(CeO_2)_b(ZrO_2)_{1-b}(La_2O_3)_d$, in which the values a, b and d are molar ratios falling in the range of 0.4≦a≦2.5, 0.2≦b≦0.7, and 0.005≦d≦0.1, respectively;
      (iv) $(Al_2O_3)_a(CeO_2)_b(ZrO_2)_{1-b}(Y_2O_3)_c(La_2O_3)_d$, in which the values a, b, c and d are molar ratios falling in the range of 0.4≦a≦2.5, 0.2≦b≦0.7, 0.01≦c≦0.2, and 0.005≦d≦0.1, respectively;
      the mixture comprising particles having a particle diameter of 5 μm or more in an amount of 30% by volume or more.

2. The catalyst of claim 1, wherein the porous oxide is at least one selected from the group consisting of alumina, zeolite, mordenite, FSM, alumina-zirconia composite oxide, silica, zirconia, titania, and silica-alumina.

3. The catalyst of claim 1, wherein said mixture comprises particles having a particle diameter of 5 μm or more in an amount of 40% by volume or more.

4. The catalyst of claim 3, wherein said mixture comprises particles having a particle diameter of 5 μm or more in an amount of 50% by volume or more.

5. The catalyst of claim 1, wherein said composite oxide further comprises at least one additive element selected from the group consisting of alkali metals, alkaline-earth metals, rare-earth metals, and transition elements in an amount of 0.05 or less by molar ratio as an oxide.

6. The catalyst of claim 1, wherein the $CeO_2$ and 50% or more of the $ZrO_2$ are present in the form of a solid solution.

7. The catalyst of claim 6, wherein the solubility of the $ZrO_2$ is 70% or more.

8. The catalyst of claim 7, wherein the solubility of the $ZrO_2$ is 80% or more.

9. The catalyst of claim 1, wherein the $CeO_2$ and the $ZrO_2$ are present in the form of a solid solution; and
   a mean crystal diameter of the ceria-zirconia solid solution is 10 nm or less by X-ray diffraction measurement after heating said support at 1000° C. for five hours or more.

10. The catalyst of claim 1, wherein a weight ratio of the porous oxide and the composite oxide of said support satisfies the condition, 0.3≦(composite oxide)/(porous oxide+composite oxide)≦0.7.

11. The catalyst of claim 10, wherein the weight ratio of the porous oxide and the composite oxide in the support satisfies the condition, 0.4≦(composite oxide)/(porous oxide+composite oxide)≦0.6.

12. The catalyst of claim 1, wherein Pd is loaded on the composite oxide; and at least one of Pt and Rh is loaded on the support.

13. The catalyst of claim 1, wherein said mixture comprising particles having a particle diameter of 5 μm or more is in an amount of less than 85% by volume.

14. The catalyst of claim 1, wherein said composite oxide is produced by a coprecipitation process or a sol-gel process.

15. The catalyst of claim 1, wherein a is from 0.4 to 2.0.

16. The catalyst of claim 15, wherein a is from 0.4 to 1.0.

17. The catalyst of claim 16, wherein a is from 0.45 to 0.7.

18. The catalyst of claim 1, wherein b is from 0.3 to 0.6.

19. The catalyst of claim 18, wherein b is from 0.4 to 0.6.

20. The catalyst of claim 1, wherein said composite oxide comprises particles having crystallites therein, said crystallites having an average diameter of not more than 10 nm.

21. The catalyst of claim 1, wherein said noble metal is loaded on the support in an amount of from 0.1 to 20% by weight with respect to the support.

22. The catalyst of claim 1, having a mean particle diameter in a range of from 3.5 to 20 μm.

23. The catalyst of claim 22, having a mean particle diameter in a range of from 4.5 to 14 μm.

* * * * *

UNITED STATES PATENT AND TRADEMARK OFFICE
CERTIFICATE OF CORRECTION

PATENT NO. : 6,335,305 B1　　　　　　　　　　　　　　　　　　　　　　Page 1 of 1
DATED : January 1, 2002
INVENTOR(S) : Suzuki et al.

It is certified that error appears in the above-identified patent and that said Letters Patent is hereby corrected as shown below:

<u>Title page,</u>
Item [30], the Foreign Application Priority Data should read as follows:

-- [30]　　　　Foreign Application Priority Data

Jan. 18, 1999　　　　(JP) ....................... 11-9826
Jan. 18, 2000　　　　(JP) ................. 2000-008589 --

Signed and Sealed this

Fourth Day of June, 2002

*Attest:*

*Attesting Officer*

JAMES E. ROGAN
*Director of the United States Patent and Trademark Office*